United States Patent [19]
Chen et al.

[11] Patent Number: 6,013,705
[45] Date of Patent: Jan. 11, 2000

[54] SILICONE GELS AND COMPOSITES FROM SHEET AND TUBE ORGANOFUNCTIONAL SILOXANE POLYMERS

[75] Inventors: Chenggang Chen, Cleveland, Ohio; Dimitris Elias Katsoulis, Midland, Mich.; Malcolm Edward Kenney, Cleveland Heights, Ohio

[73] Assignee: Dow Corning Corporation, Midland, Mich.

[21] Appl. No.: 09/156,136

[22] Filed: Sep. 17, 1998

[51] Int. Cl.[7] ........................................... C08K 5/34
[52] U.S. Cl. .................. 524/100; 524/104; 524/173; 524/233; 524/588; 525/477; 528/39
[58] Field of Search .............................. 525/477; 524/100, 524/104, 173, 233, 588; 528/39

[56] References Cited

U.S. PATENT DOCUMENTS 5,605,982  2/1997  Chao ........................................ 525/474
5,627,241  5/1997  Chen ........................................ 525/474

*Primary Examiner*—Margaret G. Moore
*Attorney, Agent, or Firm*—James L. De Cesare

[57] ABSTRACT

Articles of manufacture, such as bulk composites, composite coatings, and composite films, can be prepared by exposing a gel to air, and allowing it to stand at room temperature to cure. The gel is obtained by mixing an organopolysiloxane sheet or tube polymer with an alkoxysilane. Organopolysiloxane sheet or tube polymers are obtained by contacting sheet or tube silicates with an organohalosilane and a solvent, and heating the mixture.

16 Claims, No Drawings

SILICONE GELS AND COMPOSITES FROM SHEET AND TUBE ORGANOFUNCTIONAL SILOXANE POLYMERS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to gels and composites made of polymers derived from naturally occurring sheet silicates, synthetic sheet silicates, naturally occurring tube silicates, and synthetic tube silicates.

BACKGROUND OF THE INVENTION

While U.S. Pat. No. 5,605,982 (Feb. 25, 1997) describes a process for making organopolysiloxane sheet or tube polymers by contacting a sheet or tube silicate with an alkenyl group containing chlorosilane to form an alkenylsiloxy polymer, it does not teach the reaction of a dihalosilane or a trihalosilane with a sheet silicate or a tube silicate, to produce sheet or tube-like organosiloxane polymers containing pendent groups of the particular type as described herein. The advantage of the pendent organofunctional group of the particular type described herein on such sheet or tube siloxane polymers is that it allows the sheets or tubes of the polymers to become crosslinked to gels and composite silicone matrices.

BRIEF SUMMARY OF THE INVENTION

The invention relates to gels and composites made from organopolysiloxane sheet or tube polymers which are prepared by contacting a sheet or tube silicate with an organohalosilane, in the presence of a polar solvent or in the presence of a mixture of a polar solvent and a non-polar solvent; and heating the resulting mixture of the sheet or tube silicate, the organohalosilane, and the solvent, until an organopolysiloxane sheet or tube polymer is formed.

The gels are prepared by mixing the organopolysiloxane sheet or tube polymer with an alkoxysilane, and allowing the mixture to stand at room temperature or above, for a time sufficient for gelation to occur.

The composites, i.e., articles of manufacture such as bulk composites, composite coatings and composite films, are prepared by exposing the gel to air, and allowing the gel to stand at room temperature or above, for a time sufficient for the gel to cure.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

In particular, the present invention is directed to the preparation, characterization, and utilization of composite systems prepared from exfoliated sheet organofunctional siloxane polymers in silicone matrices. It is also particularly directed to the synthesis and utilization of composite systems from opened tube organofunctional siloxane polymers and silicone matrices. The sheet and tube polymers are derived from naturally occurring and synthetic sheet silicates and synthetic tube silicates.

For preparing the composite, the sheet or the tube organofunctional siloxane polymer is mixed at room temperature (about 20–25° C.) with a curable silicone matrix, e.g., an alkoxysilane, and then allowed to cure. The silicone matrix should be of a type possessing a strong intermolecular attraction with the sheet or tube polymer, so as to be sufficient to cause its exfoliation or opening. This process results in an increase in the viscosity of the matrix and the formation of a transparent, translucent or opaque gel.

Complete exfoliation of the sheet polymers can be deduced from the loss of the low angle powder X-ray diffractometry (XRD) reflection that characterizes interlayer spacing for sheet polymers. Strong intermolecular attraction between the matrix and the sheet or tube polymer can be provided by using materials having the same or similar organo groups.

For example, an apophyllite-derived bis-(3-cyanopropyl) hydroxysiloxy sheet polymer, or a 3-cyanopropylmethylhydroxysiloxy sheet polymer, can be exfoliated, and will readily form composites in alkoxysilanes such as 2-cyanoethyltrimethoxysilane, 2-cyanoethyltriethoxysilane, 3-cyanopropyltrimethoxysilane, 3-cyanopropyltriethoxysilane, 3-cyanopropylmethyldimethoxysilane, bis-(3-cyanopropyl)dimethoxysilane. (cyanomethylphenethyl)trimethoxysilane, and 11-cyanoundecyltrimethoxysilane.

While the type of silicone matrix preferred herein is a condensation cure system, such as described above, other curing systems typically employed in silicone technology can be used, including by means of example, hydrosilylation cure, photocure, free-radical cure, or peroxide cure systems providing the matrix has accessible silanol or alkoxy groups.

The composites are useful as films and coatings. The films and coatings can be used as gas barriers, as high temperature coatings, or as fire resistant materials. They are also useful as high strength monoliths due to the substantial or complete exfoliation of the sheet polymer or opening of the tube polymer. In addition, the materials are capable of functioning as components of sealant formulations, resin matrix composites, elastomers, and gels.

The sheet silicate most preferred to be used herein is the mineral apophyllite, $KCa_4Si_8O_{20}(F,OH).8H_2O$, while the most preferred tube silicate is a synthetic silicate $K_2CuSi_4O_{10}$. Other natural and synthetic layered and tube silicates can also be used, such as magadiite, $Na_2Si_{14}O_{29}.7H_2O$; kenyaite, $Na_2Si_{22}O_{45}.9H_2O$; silinaite, $NaLiSi_2O_5.2H_2O$; or chrysotile, $Mg_3(OH)_4Si_2O_5$.

The sheet silicate apophyllite $KCa_4Si_8O_{20}(F,OH).8H_2O$ and other such silicates are commercially available, and may be purchased from supply houses such as Ward's Natural Science Establishment, Rochester, N.Y.; and Gelest, Tullytown, Pa.

Methods of preparing tube silicates such as $K_2CuSi_4O_{10}$ are described in various publications including U.S. Pat. No. 4,942,026 (Jul. 17, 1990); U.S. Pat. No. 5,605,982 (Feb. 25, 1997); U.S. Pat. No. 5,627,241 (May 6, 1997); *Polymer Preprints* (American Chemical Society, Division of Polymer Chemistry) Volume 32(3), Pages 508–509, (1991); and *Colloids and Surfaces*, Volume 63, Pages 139–149, (1992).

According to this invention, a typical synthesis involves the reaction of a halosilane, e.g., $R_2SiX_2$ or $RSiX_3$, with a sheet silicate or a tube silicate to produce a sheet-like or tube-like organosiloxane polymer that contains a pendent organofunctional group.

The halosilane is a dichlorosilane or a trichlorosilane represented by the formula $R^1R^2SiCl_2$ or $R^1SiCl_3$ where $R^1$ and $R^2$ represent an alkyl group containing 1–30 carbon atoms; another type of non-reactive group such as an aryl group, an alkaryl group, or an aralkyl group; or a polar group such as cyanoalkyl. Most preferably, at least one $R^1$ or $R^2$ group in the halosilane is a polar group. Representative of other groups which can be used besides an alkyl group are aryl groups such as phenyl and xenyl; alkaryl (alkylaryl) groups such as tolyl and xylyl; and aralkyl (arylalkyl) groups such as benzyl, phenylethyl, and 2-phenylpropyl.

Some examples of suitable dichlorosilanes and trichlorosilanes are 2-cyanoethylmethyldichlorosilane, $(NCCH_2CH_2)(CH_3)SiCl_2$; 3-cyanopropylmethyldichlorosilane, $(NCCH_2CH_2CH_2)(CH_3)SiCl_2$; 3-cyanopropylphenyldichlorosilane, $(NCCH_2CH_2CH_2)(C_6H_5)SiCl_2$; bis-3-(cyanopropyl)dichlorosilane, $(NCCH_2CH_2CH_2)_2SiCl_2$; 3-cyanobutylmethyldichlorosilane, $(NCCH(CH_3)CH_2CH_2)(CH_3)SiCl_2$; 2-cyanoethyltrichlorosilane, $(NCCH_2CH_2)SiCl_3$; 3-cyanopropyltrichlorosilane, $(NCCH_2CH_2CH_2)SiCl_3$; and 3-cyanobutyltrichlorosilane, $(NCCH(CH_3)CH_2CH_2)SiCl_3$.

The reaction is carried out in the presence of a solvent. Representative polar solvents that are useful herein include N,N-dimethylformamide (DMF), dimethyl sulfoxide (DMSO), 1-methyl-2-pyrrolidinone, and 1,3-dimethyl-3,4,5,6-tetrahydro-2(1H)-pyrimidinone (DMPU). The reaction can also be carried out in the presence of a mixture of a polar solvent and a non-polar solvent, such as a mixture of N,N-dimethylformamide and toluene, for example.

For convenience, the following abbreviations are used to identify the sheet polymers. Thus, A-$C_2H$ is used for the apophyllite-derived bis-(3-cyanopropyl)hydroxysiloxy sheet polymer having the formula $[((NCC_3H_6)_2(HO)SiO)_x(HO)_{1-x}SiO_{1.5}]_n$; while A-CMH is used for the apophyllite-derived 3-cyanopropylmethylhydroxysiloxy sheet polymer having the formula $[((NCC_3H_6)(CH_3)(HO)SiO)_x(HO)_{1-x}SiO_{1.5}]_n$.

In the formulas, the value of "x" can be determined by solid state nuclear magnetic resonance (NMR) experiments, and typically, x is equal to or less than about 0.60. However, a value for "n" is not determinable.

As used herein, the term "exfoliated" is intended to mean a substantial or complete separation or disassociation of the individual sheets of a sheet polymer, and the term "opened" is intended to mean a substantial or complete separation of the tubes of a tube polymer.

EXAMPLES

The following examples illustrate this invention in more detail as it relates to an A-CMH—$(NCC_2H_4)Si(OCH_3)_3$ composite.

Example 1

Synthesis of Apophyllite-Derived 3-Cyanopropylmethylhydroxysiloxy Sheet Polymer, $[((NCC_3H_6)(CH_3)(HO)SiO)_x(HO)_{1-x}SiO_{1.5}]_n$, A-CMH A suspension of apophyllite (120 mesh, 3.0 g, 3.3 mmol), 3-cyanopropylmethyldichlorosilane $(NCC_3H_6)(CH_3)SiCl_2$ (24 mL, 0.15 mol), and dimethylformamide (120 mL) was refluxed for 2.3 h and filtered. The solid was washed with hexane (150 mL), acetone (60 mL), a solution of water and acetone (1:1, 300 mL), and hexane (150 mL), dried (60 torr, 60° C.), and weighed (3.1 g). The following are the product powder X-ray diffractometry (XRD) data (d(Å) (I/I$_0$)): 16.7 (100). The following are the product infrared (IR) spectroscopy data (evaporated acetone-gel coating on KBr, cm$^{-1}$): 3446 (m br, H-bonded OH stretch), 2938 (m, CH stretch), 2890 (m, CH stretch), 2246 (m, CN stretch), 1456 (w), 1424 (m), 1350 (w, CH deformation), 1268 (s, SiC), 1058 (vs br, SiOSi stretch), 866 (w), 796 (s), 666 (w), 540 (w), 440 (s).

This synthesis of apophyllite-derived 3-cyanopropylmethylhydroxysiloxy sheet polymer, $[((NCC_3H_6)(CH_3)(HO)SiO)_x(HO)_{1-x}SiO_{1.5}]_n$, A-CMH, can be shown with reference to the following reaction:

$$KCa_4Si_8O_{20}(F,OH)\cdot 8H_2O+(NCC_3H_6)(CH_3)SiCl_2 \rightarrow [((NCC_3H_6)(CH_3)(HO)SiO)_x(HO)_{1-x}SiO_{1.5}]_n$$

Evidence for the formation of this A-CMH polymer as depicted above is provided by the presence of OH, CH, CN, and SiO bands in its infrared spectrum, and by the presence of a strong line in its X-ray powder pattern at 16.7 Å. The intensity and narrowness of the line in its powder pattern indicates that its sheets are quite planar and are stacked in orderly stacks.

Example 2

Gel

A mixture of A-CMH (0.16 g) and 2-cyanoethyltrimethoxysilane $(NCC_2H_4)Si(OCH_3)_3$ (1.9 g) was allowed to stand at room temperature for 1 day in a closed vial. The gel is cloudy and stiff.

Example 3

Bulk Composite

The A-CMH—$(NCC_2H_4)Si(OCH_3)_3$ gel prepared in Example 2 was exposed to air at room temperature for 3 days. The following are the product XRD data (d(Å) (I/I$_0$)): 10.6 (100), 3.9 (br, 43). The bulk composite is a hard, white solid.

Example 4

Composite Coating

A thin layer of the A-CMH—$(NCC_2H_4)Si(OCH_3)_3$ 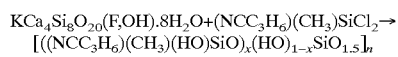 gel prepared in Example 2 was spread on a glass microscope slide, and exposed to air at room temperature for 1 day. The following are the product XRD data (d(Å) (I/I$_0$)): 10.4 (100), 4.0 (br, 31). The composite coating is white and loosely adherent.

Example 5

Film Composite

A thin layer of the A-CMH—$(NCC_2H_4)Si(OCH_3)_3$ gel prepared in Example 2 was spread on a Teflon® sheet and exposed to air at room temperature for 1 day. The resulting film was then gently separated from the sheet. The following are the product XRD data (d(Å) (I/I$_0$)): 10.4 (100), 3.9 (br, 50). The film is white and brittle.

Example 6

Physical Mixture for Comparison $(NCC_2H_4)Si(OCH_3)_3$ (1.6 g) was exposed to air at room temperature for 4 days. The resulting white solid (0.95 g) was ground with a mortar and pestle, and the powder was mixed the A-CMH (81 mg). The following are the product XRD data (d(Å) (I/I$_0$)): 17.0 (23), 10.4 (100), 4.0 (br. 24).

The absence of ~17 Å line in the powder patterns of the bulk composite, the coating composite, and the film composite, and the presence of an ~17 Å line in the patterns of A-CMH itself, and a mixture of A-CMH and cured $(NCC_2H_4)Si(OCH_3)_3$ (which had a smaller percentage of A-CMH than the composite), shows that the sheets of the A-CMH in the bulk composite, the coating composite, and the film composite are substantially or fully exfoliated.

Synthesis of the gel and the composite under very mild conditions, i.e., at room temperature and in the absence of an added catalyst, provides strong evidence that the sheets of the composite are not degraded.

Since the pendent groups on the sheets carry accessible silanol groups, it is believed that the sheets become crosslinked to the composite matrix. A curing reaction leading to the composite can be approximated as shown below:

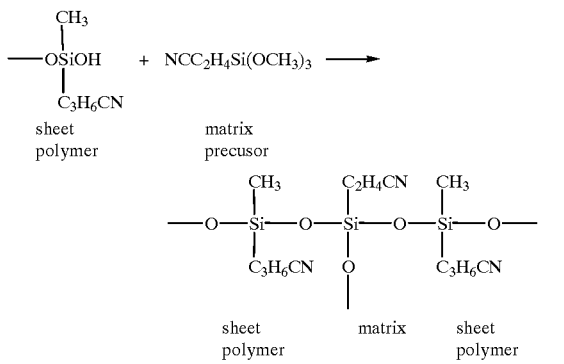

The hardness of the resulting composite can be attributed to the three-dimensional crosslinking present in the composite. The white color of the composite is ascribed to a mismatch between the index of refraction of A-CMH and the matrix.

The ability of $(NCC_2H_4)Si(OCH_3)_3$ to form such a composite is attributed to the polyfunctional nature of this particular silane. In this regard, the nitrile functionality provides the silane with the ability to serve as an effective exfoliating agent, while the three methoxysilane functionalities provide the silane with the ability to serve as an effective crosslinking agent. Noteworthy for this silane are the mildness of the conditions required for both gel formation and for gel curing.

Since the conversion of the gel to the composite involves only the loss of $CH_3OH$, and not loss of the whole silane, the composite is compact and is not an aerogel.

The following additional examples are set forth for the purpose of illustrating the invention in still more detail as it relates to an A-CMH—$(NCC_3H_6)(CH_3)Si(OCH_3)_2$ composite.

Example 7
Synthesis of Apophyllite-Derived 3-Cyanopropylmethylhydroxysiloxy Sheet Polymer, $[((NCC_3H_6)(CH_3)(HO)SiO)_x(HO)_{1-x}SiO_{1.5}]_n$, A-CMH A-CMH was made as described above in Example 1.

Example 8
Gel

A mixture of A-CMH (0.15 g) and 3-cyanopropylmethyldimethoxysilane $(NCC_3H_6)Si(CH_3)(OCH_3)_2$ (0.85 g) was allowed to stand at room temperature for 1 day in a closed vial. The gel is cloudy and stiff.

Example 9
Bulk Composite

The A-CMH—$(NCC_3H_6)(CH_3)Si(OCH_3)_2$ gel prepared in Example 8 was exposed to air for 4 days. The following are the product XRD data (d(Å) ($I/I_0$)): 10.4 (100), 4.0 (br, 33). The bulk composite is cloudy and relatively pliable.

The absence of ~17 Å line in the powder pattern of the bulk composite and the presence of such a line in the pattern of the A-CMH composition leads to the conclusion that the sheets in the bulk composite are substantially or completely delaminated. The mild conditions used for the preparation of the gel and the composite suggest that the sheets in the gel and in the composite are not degraded. An approximation of the composite crosslinking reaction is shown below:

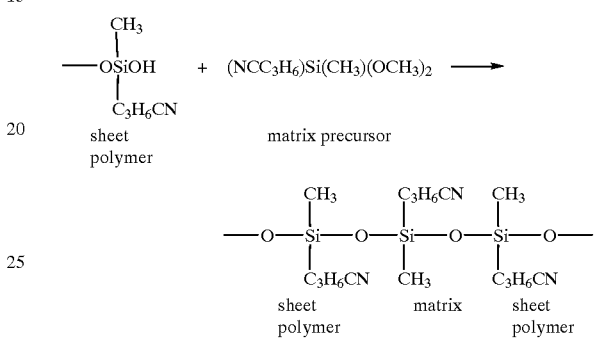

Cloudiness in the appearance of this composite is ascribed to a refractive index mismatch, as noted above. The pliability of the composite is attributed to the presence of two, rather than three, methoxy groups in the matrix forming the silane, as this factor leads to less crosslinking. Again, the ease of synthesis of the composite is notable.

The following further examples are set forth for the purpose of illustrating the invention in yet more detail as it relates to an A-C₂H—$(NCC_2H_4)Si(OCH_3)_3$ composite.

Example 10
Synthesis of Apophyllite-Derived Bis-(3-cyanopropyl)hydroxysiloxy Sheet Polymer, $[((NCC_3H_6)_2(HO)SiO)_x(HO)_{1-x}SiO_{1.5}]_n$, A-C₂H A suspension of apophyllite (120 mesh, 1.2 g, 1.3 mmol), bis-(3-cyanopropyl)dichlorosilane $(NCC_3H_6)_2SiCl_2$ (10 mL, 50 mmol), and dimethylformamide (20 mL), was refluxed for 1.5 h and filtered. The solid was washed with hexane (60 mL), acetone (30 mL), a solution of water and acetone (1:1, 100 mL), and hexane (60 mL), air-dried, and weighed (1.24 g). The following are the product XRD data (d(Å) ($I/I_0$)): 17.6 (100). The following are the product infrared (IR) spectroscopy data (evaporated acetone-gel coating on KBr, cm⁻¹): 3384 (s br, H-bonded OH stretch), 2938 (s, CH stretch), 2884 (m, CH stretch), 2246 (s, CN stretch), 1454 (w), 1424 (m), 1352 (w), 1066 (vs br, SiOSi stretch), 866 (w), 786 (s), 442 (s).

This synthesis of apophyllite-derived bis-(3-cyanopropyl)methylhydroxysiloxy sheet polymer, $[((NCC_3H_6)_2(HO)SiO)_x(HO)_{1-x}SiO_{1.5}]_n$, A-C₂H, is similar to that of the synthesis of A-CMH shown previously. The reaction can be depicted as shown below:

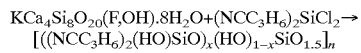

Evidence for the formation of this A-C₂H polymer is provided by the presence of strong OH, CH, CN, and SiO bands in its infrared spectrum, and by the presence of a line in its X-ray powder pattern at 17.6 Å. The considerable intensity of its powder pattern line indicates that the sheets of the polymer are quite planar, and that they are stacked in an orderly fashion.

Example 11

Gel

A mixture of A-C$_2$H (0.14 g) and 2-cyanoethyltrimethoxysilane, (NCC$_2$H$_4$)Si(OCH$_3$)$_3$, (1.5 g) was allowed to stand at room temperature for 1 day in a closed vial. The gel is cloudy and stiff.

Example 12

Bulk Composite

The A-C$_2$H—NCC$_2$H$_4$Si(OCH$_3$)$_3$ gel prepared in Example 11 was exposed to air at room temperature for 3 days. The following are the product XRD data (d(Å) (I/I$_0$)): 10.5 (100), 3.9 (br, 35). The bulk composite is a hard, white solid.

Example 13

Physical Mixture for Comparison (NCC$_2$H$_4$)Si(OCH$_3$)$_3$ (2.5 g) was exposed to air at room temperature for 3 days. The resulting solid was ground and the powder was mixed with A-C$_2$H (0.14 g). The following are the product XRD data (d(Å) (I/I$_0$)): 17.0 (23), 10.4 (100), 4.0 (br, 24).

The presence of a clear ~17 Å line in the powder pattern of the physical mixture, but not in that of the composite, provides evidence that the composite contained nearly fully or fully delaminated sheets. The absence of an ~17 Å line in the powder pattern of the bulk composite, and the presence of such a line in the pattern of the A-C$_2$H composition itself, and the mixture of A-C$_2$H and cured (NCC$_2$H$_4$)Si(OCH$_3$)$_3$ (which had a lower percentage of A-C$_2$H than the composite) leads to the conclusion that the sheets in the bulk composite are substantially or fully delaminated. The synthesis of the gel and the synthesis of the composite under very mild conditions indicates that sheets of the gel and the sheets of the composite are not degraded. The composite curing reaction can be approximated as shown below:

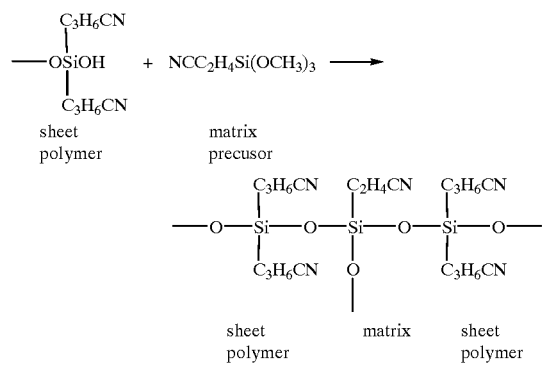

The hardness and the color of this composite can be explained the same as for the composite made from the A-CMH—(NCC$_2$H$_4$)Si(OCH$_3$)$_3$ gel noted above. The mildness of the conditions required for the formation of the gel and for the formation of the composite are noteworthy.

These examples demonstrate that certain alkoxysilanes are capable of yielding fully exfoliated, compact composites, with A-CMH and with A-C$_2$H.

Other variations may be made in compounds, compositions, and methods described herein, without departing from the essential features of the invention. The embodiments specifically illustrated herein are exemplary only, and not intended as limitations on their scope, except as defined in the appended claims.

We claim:

1. A method of making a gel from an organopolysiloxane sheet or tube polymer comprising contacting a sheet or tube silicate with an organohalosilane, in the presence of a polar solvent or in the presence of a mixture of a polar solvent and a non-polar solvent; heating the resulting mixture of the sheet or tube silicate, the organohalosilane, and the solvent, until an organopolysiloxane sheet or tube polymer is formed; the organohalosilane being a dihalosilane or trihalosilane having the formula R$^1$R$^2$SiX$_2$ or R$^1$SiX$_3$ wherein X represents a halogen; R$^1$ and R$^2$ each represent an alkyl group containing 1–30 carbon atoms, an aryl group, an alkaryl group, an aralkyl group or a polar alkyl group; mixing the organopolysiloxane sheet or tube polymer with an alkoxysilane; and allowing the mixture of the organopolysiloxane sheet or tube polymer and the alkoxysilane to stand at room temperature or above, for a time sufficient for gelation to occur.

2. A method according to claim 1 in which the organohalosilane is a compound selected from the group consisting of 2-cyanoethylmethyldichlorosilane, (NCCH$_2$CH$_2$)(CH$_3$)SiCl$_2$; 3-cyanopropylmethyldichlorosilane, (NCCH$_2$CH$_2$CH$_2$)(CH$_3$)SiCl$_2$; 3-cyanopropylphenyldichlorosilane, (NCCH$_2$CH$_2$CH$_2$)(C$_6$H$_5$)SiCl$_2$; bis-3-(cyanopropyl)dichlorosilane, (NCCH$_2$CH$_2$CH$_2$)$_2$SiCl$_2$; 3-cyanobutylmethyldichlorosilane, (NCCH(CH$_3$)CH$_2$CH$_2$)(CH$_3$)SiCl$_2$; 2-cyanoethyltrichlorosilane, (NCCH$_2$CH$_2$)SiCl$_3$; 3-cyanopropyltrichlorosilane, (NCCH$_2$CH$_2$CH$_2$)SiCl$_3$; and 3-cyanobutyltrichlorosilane, (NCCH(CH$_3$)CH$_2$CH$_2$)SiCl$_3$.

3. A method according to claim 1 in which the silicate is selected from the group consisting of apophyllite KCa$_4$Si$_8$O$_{20}$(F,OH).8H$_2$O; K$_2$CuSi$_4$O$_{10}$, magadiite Na$_2$Si$_{14}$O$_{29}$.7H$_2$O; kenyaite Na$_2$Si$_{22}$O$_{45}$.9H$_2$O; silinaite NaLiSi$_2$O$_5$.2H$_2$O; and chrysotile Mg$_3$(OH)$_4$Si$_2$O$_5$.

4. A method according to claim 1 in which the solvent is selected from the group consisting of N,N-dimethylformamide, dimethyl sulfoxide, 1-methyl-2-pyrrolidinone, 1,3-dimethyl-3,4,5,6-tetrahydro-2(1H)-pyrimidinone, and mixtures thereof with toluene.

5. A method according to claim 1 further comprising making an article of manufacture selected from the group consisting of a bulk composite, a composite coating, and a composite film, by exposing the gel prepared according to claim 1 to air, and allowing the gel to stand at room temperature or above, for a time sufficient for the gel to cure.

6. A gel prepared according to the method defined in claim 1.

7. A gel according to claim 6 in which the alkoxysilane is a compound selected from the group consisting of 2-cyanoethyltrimethoxysilane, 2-cyanoethyltriethoxysilane, 3-cyanopropyltrimethoxysilane, 3-cyanopropyltriethoxysilane, 3-cyanopropylmethyldimethoxysilane, bis-(3-cyanopropyl)dimethoxysilane, (cyanomethylphenethyl)trimethoxysilane, and 11-cyanoundecyltrimethoxysilane.

8. An article of manufacture prepared according to the method defined in claim 5.

9. A method of making a gel from an organopolysiloxane sheet or tube polymer comprising contacting a sheet or tube silicate with an organohalosilane, in the presence of a polar solvent or in the presence of a mixture of a polar solvent and a non-polar solvent; heating the resulting mixture of the sheet or tube silicate, the organohalosilane, and the solvent, until an organopolysiloxane sheet or tube polymer is formed; the organohalosilane being a dihalosilane or trihalosilane having the formula $R^1R^2SiX_2$ or $R^1SiX_3$ wherein X represents a halogen; $R^1$ and $R^2$ each represent an alkyl group containing 1–30 carbon atoms, an aryl group, an alkaryl group, an aralkyl group or a cyanoalkyl group; with the proviso that at least one of $R^1$ and $R^2$ is cyanoalkyl; mixing the organopolysiloxane sheet or tube polymer with an alkoxysilane; and allowing the mixture of the organopolysiloxane sheet or tube polymer and the alkoxysilane to stand at room temperature or above, for a time sufficient for gelation to occur.

10. A method according to claim 9 in which the organohalosilane is a compound selected from the group consisting of 2-cyanoethylmethyldichlorosilane, $(NCCH_2CH_2)(CH_3)SiCl_2$; 3-cyanopropylmethyldichlorosilane, $(NCCH_2CH_2CH_2)(CH_3)SiCl_2$; 3-cyanopropylphenyldichlorosilane, $(NCCH_2CH_2CH_2)(C_6H_5)SiCl_2$; bis-3-(cyanopropyl)dichlorosilane, $(NCCH_2CH_2CH_2)_2SiCl_2$; 3-cyanobutylmethyldichlorosilane, $(NCCH(CH_3)CH_2CH_2)(CH_3)SiCl_2$; 2-cyanoethyltrichlorosilane, $(NCCH_2CH_2)SiCl_3$; 3-cyanopropyltrichlorosilane, $(NCCH_2CH_2CH_2)SiCl_3$; and 3-cyanobutyltrichlorosilane, $(NCCH(CH_3)CH_2CH_2)SiCl_3$.

11. A method according to claim 9 in which the silicate is selected from the group consisting of apophyllite $KCa_4Si_8O_{20}(F,OH)\cdot 8H_2O$; $K_2CuSi_4O_{10}$, magadiite $Na_2Si_{14}O_{29}\cdot 7H_2O$; kenyaite $Na_2Si_{22}O_{45}\cdot 9H_2O$; silinaite $NaLiSi_2O_5\cdot 2H_2O$; and chrysotile $Mg_3(OH)_4Si_2O_5$.

12. A method according to claim 9 in which the solvent is selected from the group consisting of N,N-dimethylformamide, dimethyl sulfoxide, 1-methyl-2-pyrrolidinone, 1,3-dimethyl-3,4,5,6tetrahydro-2(1H)-pyrimidinone, and mixtures thereof with toluene.

13. A method according to claim 9 further comprising making an article of manufacture selected from the group consisting of a bulk composite, a composite coating, and a composite film, by exposing the gel prepared according to claim 1 to air, and allowing the gel to stand at room temperature or above, for a time sufficient for the gel to cure.

14. A gel prepared according to the method defined in claim 9.

15. A gel according to claim 14 in which the alkoxysilane is a compound selected from the group consisting of 2-cyanoethyltrimethoxysilane, 2-cyanoethyltriethoxysilane, 3-cyanopropyltrimethoxysilane, 3-cyanopropyltriethoxysilane, 3-cyanopropylmethyldimethoxysilane, bis-(3-cyanopropyl)dimethoxysilane, (cyanomethylphenethyl)trimethoxysilane, and 11-cyanoundecyltrimethoxysilane.

16. An article of manufacture prepared according to the method defined in claim 13.

* * * * *